(12) United States Patent
Liang

(10) Patent No.: US 8,277,177 B2
(45) Date of Patent: Oct. 2, 2012

(54) FLUIDIC RIM SEAL SYSTEM FOR TURBINE ENGINES

(75) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 870 days.

(21) Appl. No.: 12/355,924

(22) Filed: Jan. 19, 2009

(65) Prior Publication Data

US 2010/0183426 A1 Jul. 22, 2010

(51) Int. Cl.
- *F01D 5/20* (2006.01)
- *F01D 11/08* (2006.01)
- *F04D 29/08* (2006.01)
- *F04D 29/18* (2006.01)

(52) U.S. Cl. .................................. 415/173.1; 415/173.5
(58) Field of Classification Search ................ 415/173.1, 415/173.5, 174.5, 230, 1
See application file for complete search history.

(56) References Cited

U.S. PATENT DOCUMENTS

| | | |
|---|---|---|
| 4,230,324 A | 10/1980 | Derman |
| 4,330,234 A | 5/1982 | Colley |
| 4,754,983 A | 7/1988 | Kruger |
| 5,203,673 A | 4/1993 | Evans |
| 5,498,139 A | 3/1996 | Williams |
| 5,613,829 A | 3/1997 | Wolfe et al. |
| 5,688,105 A | 11/1997 | Hoffelner |
| 5,971,704 A | 10/1999 | Blattmann |
| 6,092,986 A | 7/2000 | Oeynhausen et al. |
| 6,273,671 B1 | 8/2001 | Ress, Jr. |
| 6,609,882 B2 | 8/2003 | Urlichs |
| 6,672,831 B2 | 1/2004 | Brandl et al. |
| 6,676,372 B2 | 1/2004 | Scholz et al. |
| 6,692,222 B2 | 2/2004 | Prinz et al. |
| 6,739,829 B2 | 5/2004 | Addie |
| 8,038,399 B1 * | 10/2011 | Liang .............................. 416/95 |
| 2002/0009361 A1 | 1/2002 | Reichert et al. |
| 2002/0164246 A1 | 11/2002 | Scholz et al. |
| 2004/0057826 A1 | 3/2004 | Haje |
| 2005/0069406 A1 | 3/2005 | Turnquist et al. |
| 2008/0008574 A1 | 1/2008 | Brillert |

FOREIGN PATENT DOCUMENTS

WO   WO 01/31169 A1   5/2001

* cited by examiner

*Primary Examiner* — Chuong A Luu
*Assistant Examiner* — Nga Doan

(57) ABSTRACT

A fluidic rim seal system can be provided between a neighboring stationary and rotatable components in the turbine section of a turbine engine. For instance, the stationary component can be an inner shroud associated with a vane. The inner shroud can include a groove that extends circumferentially about the shroud. The rotatable component can be a blade cover plate. The blade cover plate can include a protrusion that culminates at a tip. One or more passages can extend through the protrusion. The passages can have an inlet in fluid communication with a coolant source and an outlet at the tip. A tip region of the protrusion is received in the groove. During engine operation, an air barrier is formed in the groove by the air discharging from the outlet. This air also provides cooling to the protrusion as well as a portion of the inner shroud.

20 Claims, 3 Drawing Sheets

FLUIDIC RIM SEAL SYSTEM FOR TURBINE ENGINES

FIELD OF THE INVENTION

The invention relates in general to turbine engines and, more specifically, to a system and method for sealing between stationary and rotating turbine components.

BACKGROUND OF THE INVENTION

Referring to FIG. 1, the turbine section 10 of a turbine engine includes a plurality of disks 12 provided on a rotor (not shown). The discs 12 are axially spaced along the rotor. A plurality of blades 14 are mounted on each disk 12 to form a row of blades 14. The blades 14 are circumferentially arrayed about each disk 12 and extend radially outward therefrom.

The rows of blades 14 alternate with rows of stationary airfoils or vanes 16. The vanes 16 are attached at one end to a vane carrier 18 and extend radially inward therefrom to a radially inner end, which can include an inner shroud 20. Additional structures can be attached to the inner shroud 20, including, for example, a u-shaped ring 22. Labyrinth seals 23 can be attached to the u-shaped ring 22 as well as portions of nearby rotor disks 12 to minimize leakage flow across the interface between them.

The u-shaped ring 22 defines in part a cavity 30. Coolant, such as air, is supplied to the cavity 30. The air is discharged from the cavity 30 to cool the u-ring 22. Such air is also be used to purge hot gases 28 ingested from a radially outer region 26 of the turbine 10 from a forward cavity 32 and an aft cavity 34 defined between the neighboring stationary and rotating structures.

Due to the large pressure differentials between the forward cavity 32 and the aft cavity 34, the forward cavity 32 requires a higher purge air pressure than the aft cavity 34 to prevent hot gas ingestion. However, the purge air for both cavities 32, 34 is supplied from the same source (the u-ring 22). As a result, inefficient distribution of the air occurs, as the majority of the air will naturally tend to the low pressure of the aft cavity 34 and will be able to do so because of the gap 38 between the u-ring 22 and the rotor disks 12. Such an inefficient arrangement keeps the demand for the air at a high level, which prevents the beneficial use of such air in other areas. In some cases, hot gas ingestion into the forward cavity 32 is a result of such inefficient distribution of the purge air.

One additional manner of minimizing has gas ingestion into either of the cavities 32, 34 is to provide a blade cover plate 24 with a single knife edge rim 26, which can create a tortuous path for impeding hot gas ingestion into the cavities 32, 34. However, this alone is an insufficient barrier to hot gas ingestion.

Thus, there is a need for a system and method that can control of rim cavity leakage flow distribution to reduce turbine rim cavity total purge air demand and/or to minimize the hot gas ingestion into the rim cavity.

SUMMARY OF THE INVENTION

Embodiments of the invention are directed to a fluidic rim seal system and method. In one aspect, a system according to aspects of the invention can be used between a turbine component that is rotatable about an axis of rotation and neighboring a stationary turbine component. The turbine component can be a disk cover plate. A protrusion extends from the rotatable turbine component and culminates in a tip. The protrusion further extends circumferentially about the rotatable turbine component.

In one embodiment, the protrusion can include an initial axially extending portion that transitions to a generally radially extending portion. The radially extending portion can be oriented at about 90 degrees relative to the axially extending portion. A passage extends through the protrusion. The passage has an outlet at the tip. The passage can have an inlet in fluid communication with a coolant source.

The stationary turbine component can be any suitable stationary turbine structure, such as an inner shroud of a turbine vane. The stationary turbine component has a circumferentially extending groove. The groove opens generally toward the axis of rotation. The groove can be substantially v-shaped. At least a portion of the protrusion including the tip is received in the groove.

In another respect, a fluidic rim seal system can be applied between a disk cover plate and a stationary turbine component, such as an inner shroud of a turbine vane. The disk cover plate is rotatable about an axis of rotation, such as by way of it being operatively connected to a rotor disk. A protrusion extends from the disk cover plate and culminates in a tip. The protrusion further extends circumferentially about the disk cover plate. In one embodiment, the protrusion can include an initial axially extending portion that transitions to a generally radially extending portion. The radially extending portion can be oriented at about 90 degrees relative to the axially extending portion. A passage extends through the protrusion. The passage has an outlet at the tip.

The stationary turbine component has a circumferentially extending groove. The groove opens generally toward the axis of rotation. The groove can be substantially v-shaped. The groove can be proximate an end of the stationary turbine component. At least a portion of the protrusion including the tip is received in the groove.

The passage can have an inlet in fluid communication with a coolant source. Thus, coolant supplied to the passage can exit at the outlet and impinge on the groove such that an fluid barrier is formed. As a result, hot gas ingestion between the disk cover plate and the stationary turbine component can be minimized.

In one embodiment, the stationary turbine component can include a second circumferentially extending groove proximate an opposite end of the stationary turbine component. The second groove can open generally toward the axis of rotation. There can also be a second disk cover plate that is rotatable about an axis of rotation. A second protrusion can extend from the second disk cover plate and culminate in a tip. The second protrusion can further extend circumferentially about the second disk cover plate. A passage can extend through the second protrusion. The passage can have an outlet at the tip. At least a portion of the second protrusion of the including the tip can be received in the second groove.

In still another respect, aspects of the invention are directed to a method of forming a fluidic rim seal in a turbine engine. According to the method a disk cover plate and a stationary turbine component, such as an inner shroud of a turbine vane, are provided.

The disk cover plate is rotatable about an axis of rotation. A protrusion extends from the disk cover plate and culminates in a tip. The protrusion further extends circumferentially about the disk cover plate. A passage extends through the protrusion. The passage has an outlet at the tip. The protrusion can include an initial axially extending portion that transitions to a generally radially extending portion. The radially extending portion can be oriented at about 90 degrees relative to the axially extending portion.

The stationary turbine component has a circumferentially extending groove. The groove is open generally toward the axis of rotation. The groove can be substantially v-shaped.

The disk cover plate and/or the stationary turbine component are arranged, assembled and/or positioned so that at least a portion of the protrusion including the tip is received in the groove. A coolant is to the passage such that exiting coolant impinges on the groove so as to form a fluid barrier between the protrusion and the groove.

DETAILED DESCRIPTION OF THE INVENTION

Figure 1:
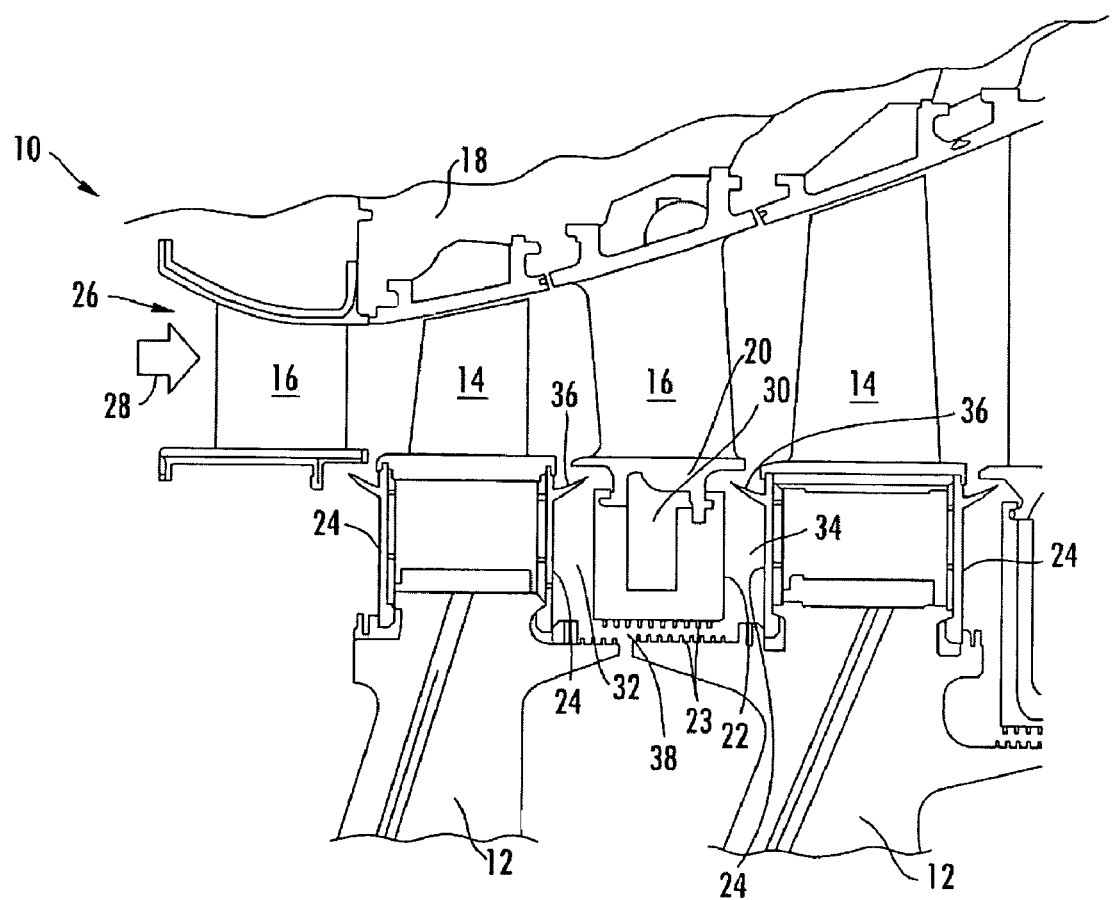
FIG. 1 is a cross-sectional view of a portion of the turbine section of a prior turbine engine.
Figure 2:
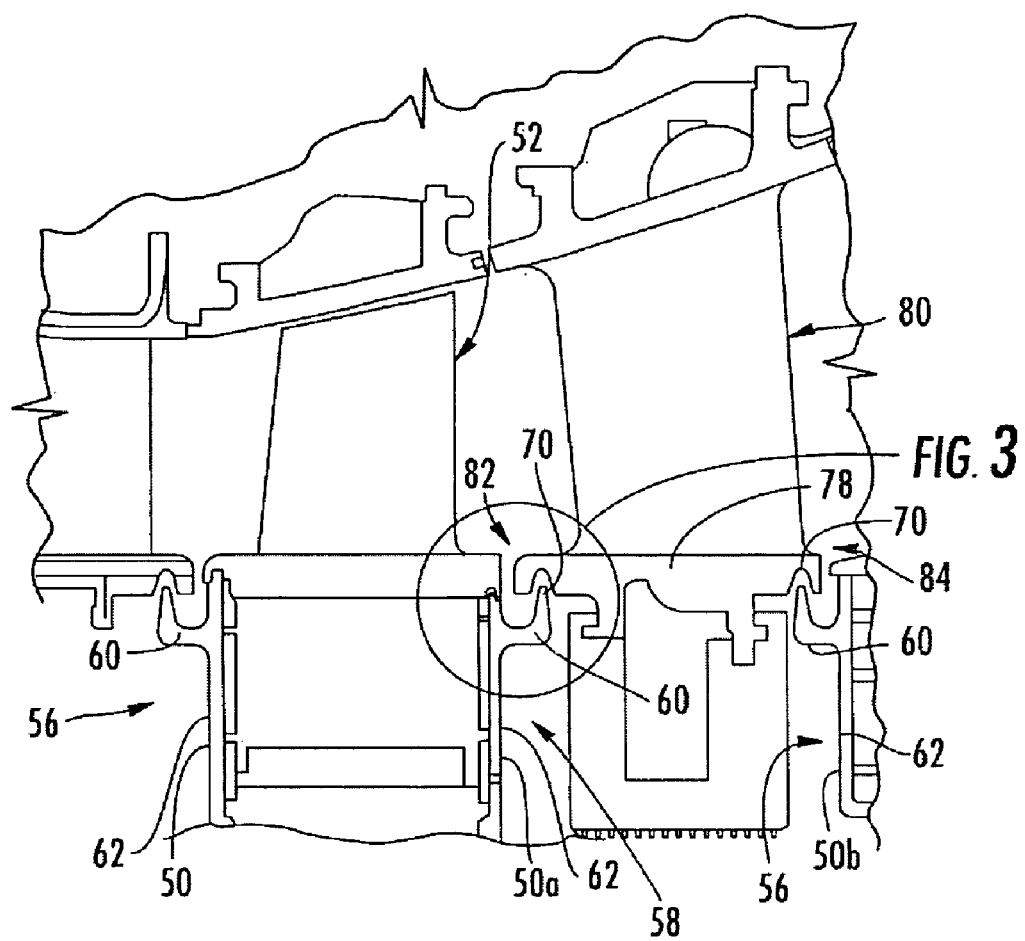
FIG. 2 is a cross-sectional view of a portion of the turbine section having a fluidic rim seal system in accordance with aspects of the invention.
Figure 3:
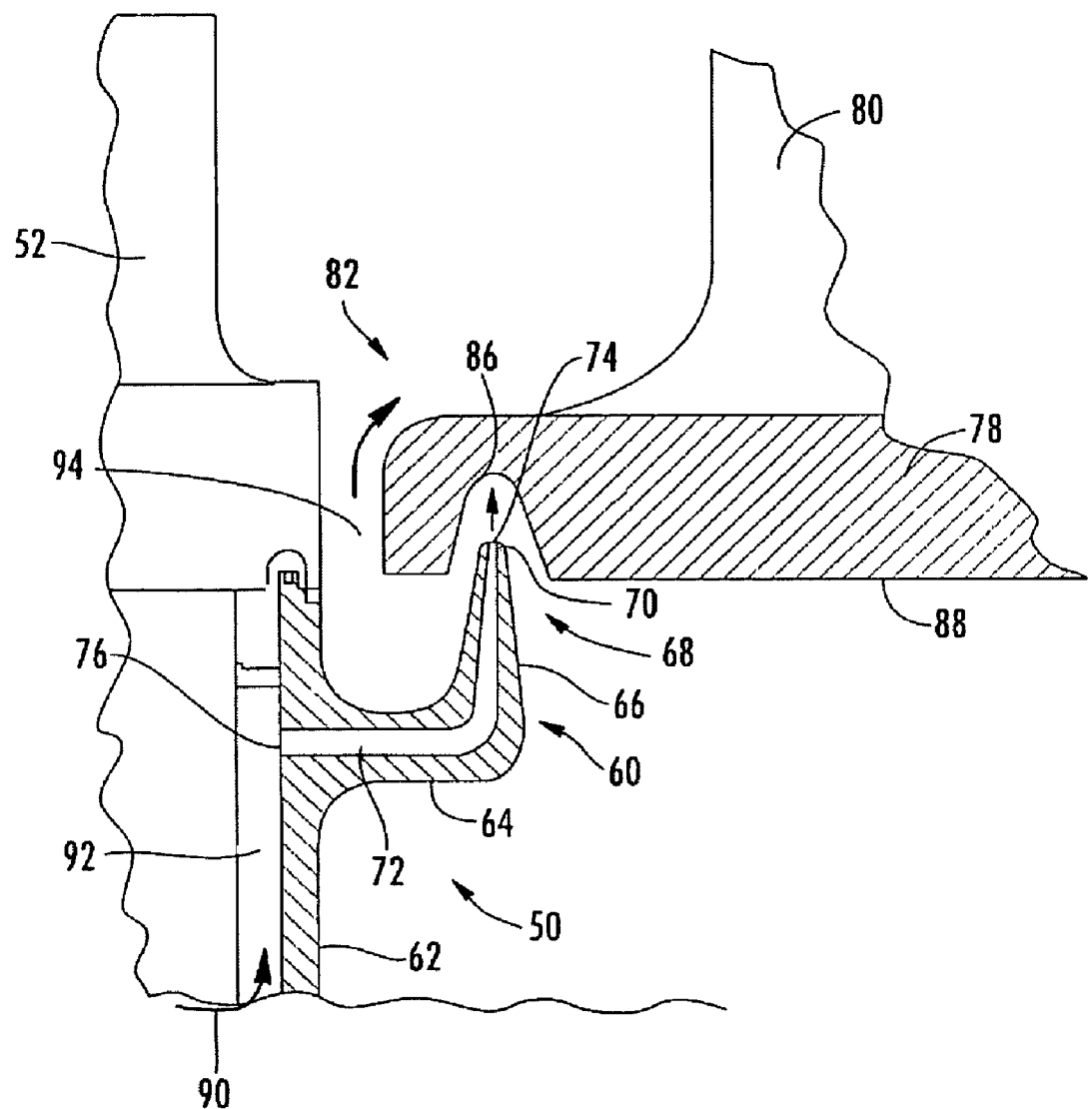
FIG. 3 is a close-up partial cross-sectional view of the fluidic rim seal system in accordance with aspects of the invention.

A system and method according to aspects of the present invention can reduce total purge air flow demand for turbine rim cavities and/or can minimize hot gas ingestion into a turbine rim cavity. Embodiments of the invention will be explained in connection with one possible arrangement, but the detailed description is intended only as exemplary. Embodiments of the invention are shown in FIGS. 2-3, but aspects of the invention are not limited to the illustrated structure or application.

Embodiments of the invention can be applied in various interfaces between stationary and rotatable components in a turbine engine. In one embodiment, the rotatable component can be a blade cover plate 50, which can be secured to one or more of the structures associated with a row of blades 52, such as the rotor disk and/or portions of blades themselves. Such securing can be achieved in any suitable manner, including, for example, by mechanical engagement. The blade cover plate 50 can be provided in any of a number of forms. For instance, the blade cover plate 50 can be a continuous ring. Alternatively, the blade cover plate 50 can be made of several segments that are abutted so as to form a substantially continuous ring. Further, it should be noted that while the term "plate" may connote a substantially flat sheet, embodiments of the invention are not limited to blade cover plates that are flat.

A blade cover plate 50 in accordance with aspects of the invention can be provided on an upstream side 56 of a row of blades 52 and/or on a downstream side 58 of the row of blades 52. The blade cover plate 50 can include a protrusion 60 that extends from a base portion 62 of the blade cover plate 50. The protrusion 60 can have any suitable conformation. In one embodiment, the protrusion 60 can have an axial portion 64, which initially extends from the base portion 62 of the blade cover plate 50 in a generally axial direction, as is shown in FIG. 3. The axial portion 64 can be substantially parallel to a portion of a neighboring stationary turbine structure. For instance, the axial portion 64 can be substantially parallel to a radially inner surface 88 of an inner shroud 78, as is shown in FIG. 3. The protrusion 60 can transition to a generally radially outward extending portion 66. The protrusion 60 can extend circumferentially about the blade cover plate 50. It should be noted that the terms "axial," "radial," "circumferential" and variations of these terms are intended to mean relative to the axis of the turbine (not shown).

The radially outwardly extending portion 66 includes a tip region 68 which culminates in a tip 70. In one embodiment, the radially outwardly extending portion 66 can be angled at about 90 degrees relative to the axial portion 64. As a result of this configuration, a circumferential rim can be formed. At least one passage 72 can extend through the protrusion 60 and can have an outlet 74 at the tip 70. The passage 72 can have an inlet 76 that is in fluid communication with a coolant source, such as cooling air. The passage 72 can be any suitable shape and size.

A stationary turbine engine component can be disposed substantially proximate to the blade cover plate 50. The stationary turbine engine component can be almost any stationary turbine structure. In one embodiment, the stationary turbine engine can be an inner shroud 78 associated with one or more of the turbine vanes 80. While the following description will be directed to the inner shroud 78, but it will be understood that the description can equally apply to other stationary turbine structures proximate the blade cover plate 50.

The inner shroud 78 can have an upstream end 82 and a downstream end 84, as shown in FIG. 2. According to aspects of the invention, the inner shroud 78 can include a groove 86 proximate the upstream and/or downstream end 82, 84 thereof. It should be noted that the terms "upstream" and "downstream" are intended to mean relative to the direction of flow in the turbine. The groove 86 can extend circumferentially about the inner shroud 78. The groove 86 can be formed in a radially inwardly facing surface 88 of the inner shroud 78 such that the groove 86 opens in the radially inner direction. The groove 86 can have any suitable shape. In one embodiment, the groove 86 can be substantially v-shaped, as shown in FIG. 3. The groove 86 can generally correspond to shape of tip region 68 of the protrusion 60. The groove 86 can be formed in any suitable manner, such as by machining.

The blade cover plate 50 and the inner shroud 78 can be arranged so that at least a portion of the tip region 68 of the protrusion 60 is received in the groove 86. The protrusion 60 does not contact the groove 86. In one embodiment, as shown in FIG. 2, the protrusion 60 of a first blade cover plate 50a can be received in a groove 86 located proximate the upstream end 82 of an inner shroud 78, and the protrusion 60 of a second blade cover plate 50b can be received in a groove 78 located proximate the downstream end 84 of the same inner shroud 78.

During engine operation, a coolant, such as air, is typically supplied to cool the interior of the blades 52. A portion of the air 90 can be channeled through a gap 92 between the blade cover plate 50 and the blade attachment into the blade dead rim cavity for cooling of the blade platform. A portion of such air can flow into the inlet 76 of the passage 72 in the protrusion 60.

The air can pass through the passage 72, which can cool the protrusion 60. The air can exit through the outlet 74 as a jet which impinges on the groove 86. As a result, the exiting air can provide cooling to the upstream and/or downstream ends 82, 84 of the shroud 78. Moreover, the exiting air can form an air curtain, which can effectively reduces the area for leakage flow to enter the forward cavity 94. As a result, hot gas ingestion can be minimized, which, in turn, reduces the demand for purge air. An additional benefit of the sealing system according to aspects of the invention is that it can reduce the sensitivity of the dimensional changes that occur at the seal gap between stationary and rotating component, such as the u-ring and rotor disks, during engine operation.

The foregoing description is provided in the context of one possible system reduce turbine rim cavities total purge air flow demand and/or minimize hot gas ingestion into the rim cavity. The system can be used in high temperature turbine cooling design, especially for turbine cooling design applications that include disks made of a low temperature material in which hot gas ingestion is prohibited. It will be appreciated that aspects of the invention can be applied to other areas between stationary and rotating components in a turbine engine. Thus, it will of course be understood that the invention is not limited to the specific details described herein, which are given by way of example only, and that various modifications and alterations are possible within the scope of the invention as defined in the following claims.

What is claimed is:

1. A fluidic rim seal system comprising:
   a turbine component being rotatable about an axis of rotation, a protrusion extending from the rotatable turbine component and culminating in a tip, the protrusion further extending circumferentially about the rotatable turbine component, wherein a passage extends through the protrusion, the passage having an outlet at the tip; and
   a stationary turbine component having a circumferentially extending groove therein, the groove being open generally toward the axis of rotation, at least a portion of the protrusion including the tip being received in the groove.

2. The system of claim 1 wherein the protrusion includes an initial axially extending portion that transitions to a generally radially extending portion.

3. The system of claim 2 wherein the radially extending portion is oriented at about 90 degrees relative to the axially extending portion.

4. The system of claim 1 wherein the passage has an inlet in fluid communication with a coolant source.

5. The system of claim 1 wherein the groove is substantially v-shaped.

6. The system of claim 1 wherein the rotatable turbine component is a disk cover plate.

7. The system of claim 1 wherein the stationary turbine component is an inner shroud of a turbine vane.

8. A fluidic rim seal system comprising:
   a disk cover plate being rotatable about an axis of rotation, a protrusion extending from the disk cover plate and culminating in a tip, the protrusion further extending circumferentially about the disk cover plate, a passage extends through the protrusion, the passage having an outlet at the tip; and
   a stationary turbine component having a circumferentially extending groove therein, the groove being open generally toward the axis of rotation, at least a portion of the protrusion including the tip being received in the groove.

9. The system of claim 8 wherein the protrusion includes an initial axially extending portion that transitions to a generally radially extending portion.

10. The system of claim 9 wherein the radially extending portion is oriented at about 90 degrees relative to the axially extending portion.

11. The system of claim 8 wherein the passage has an inlet in fluid communication with a coolant source, whereby coolant supplied to the passage exits at the outlet and impinges on the grooves such that an fluid barrier is formed.

12. The system of claim 8 wherein the groove is substantially v-shaped.

13. The system of claim 8 wherein the stationary turbine component is an inner shroud portion of a turbine vane.

14. The system of claim 8 wherein the groove is proximate an end of the stationary turbine component.

15. The system of claim 14 wherein the stationary turbine component includes a second circumferentially extending groove proximate an opposite end thereof, wherein the groove opens generally toward the axis of rotation, and further including: a second disk cover plate being rotatable about an axis of rotation,
   a second protrusion extending from the second disk cover plate and culminating in a tip, the second protrusion further extending circumferentially about the second disk cover plate, a passage extends through the second protrusion, the passage having an outlet at the tip; at least a portion of the second protrusion including the tip being received in the second groove.

16. A method of forming a fluidic rim seal in a turbine engine comprising the steps of: providing a disk cover plate rotatable about an axis of rotation, a protrusion extending from the disk cover plate and culminating in a tip, the protrusion further extending circumferentially about the disk cover plate, a passage extends through the protrusion, the passage having an outlet at the tip;
   providing a stationary turbine component having a circumferentially extending groove therein, the groove being open generally toward the axis of rotation; arranging at least one of the disk cover plate and the stationary turbine component so that at least a portion of the protrusion including the tip is received in the groove; and
   supplying a coolant to the passage such that exiting coolant impinges on the groove so as to form a fluid barrier between the protrusion and the groove.

17. The system of claim 16 wherein the protrusion includes an initial axially extending portion that transitions to a generally radially extending portion.

18. The system of claim 17 wherein the radially extending portion is oriented at about 90 degrees relative to the axially extending portion.

19. The system of claim 16 wherein the groove is substantially v-shaped.

20. The system of claim 16 wherein the stationary turbine component is an inner shroud of a turbine vane.

* * * * *